United States Patent
Bruijns

(10) Patent No.: US 6,975,973 B1
(45) Date of Patent: Dec. 13, 2005

(54) ANALYSIS OF AN OBJECT DATA SET ON A MULTI-DIMENSIONAL SPACE

(75) Inventor: Johannes Bruijns, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 758 days.

(21) Appl. No.: 09/857,266

(22) PCT Filed: Sep. 27, 2000

(86) PCT No.: PCT/EP00/09505

§ 371 (c)(1),
(2), (4) Date: Jun. 1, 2001

(87) PCT Pub. No.: WO01/26055

PCT Pub. Date: Apr. 12, 2001

(30) Foreign Application Priority Data

Oct. 1, 1999 (EP) .................................. 99203207

(51) Int. Cl.$^7$ ........................... G06F 17/50; G06T 7/00
(52) U.S. Cl. ............................... 703/2; 703/6; 382/254
(58) Field of Search .......................... 703/2, 6; 382/254

(56) References Cited

OTHER PUBLICATIONS

Wink et al, "Fast Quantification of Abdominal Aortic Aneurysms From CTP Volumes", MICCAI, 1998.*
Zhou et al, "The Detection and Quantification of Retinopathy Using Digital Angiograms", IEEE Transactions on Medical Imaging, Dec. 1994.*
Tolias et al, "A Fuzzy Vessel Tracking Algorithm for Retinal Images Basedon Fuzzy Clustering", IEEE, Apr. 1998.*
Chun Kee Jeon et al, "A new Approach to the Estimation of Diameters in Coronary Arteriograms", Real Time Imaging, Dec. 1998, Academic Press, UK.*
Davies E.R., "A Hybrid Sequential-Parallel Approach to Accurate Circle Centre Location", Pattern Recogniton Letters, pps. 279-290, ISSN: 0167-8655.*
Hastreiter et al, "Fast Analysis of Intracranial Aneurysms based on Interactive Direct Volume rendering and CTA", MICCAI, 1998, pp. 660-669.*
Van Der Weide et al, "Calculating Optimal Angiographic angles of Cerebral Aneurysms", CAR 97 , pp. 289-294, ISBN: 0-444-82756-0.*

* cited by examiner

*Primary Examiner*—Thai Phan

(57) ABSTRACT

The method relates to analysis of a tubular structure 1 such as a rendition of the vascular system of a patient. Gradients $g_{1j}$ to the surface of the tubular structure 1 are computed in a starting point (BP). Subsequently, a normal n̂ which extends essentially perpendicularly to the gradients is derived and a cross-section is taken along a cutting plane having n̂ as its normal. A subsequent position (VP) is taken by performing a small shift in the direction of n̂. The axis of the vessel is tracked by repeating the procedure.

8 Claims, 1 Drawing Sheet

ANALYSIS OF AN OBJECT DATA SET ON A MULTI-DIMENSIONAL SPACE

Figure 1:
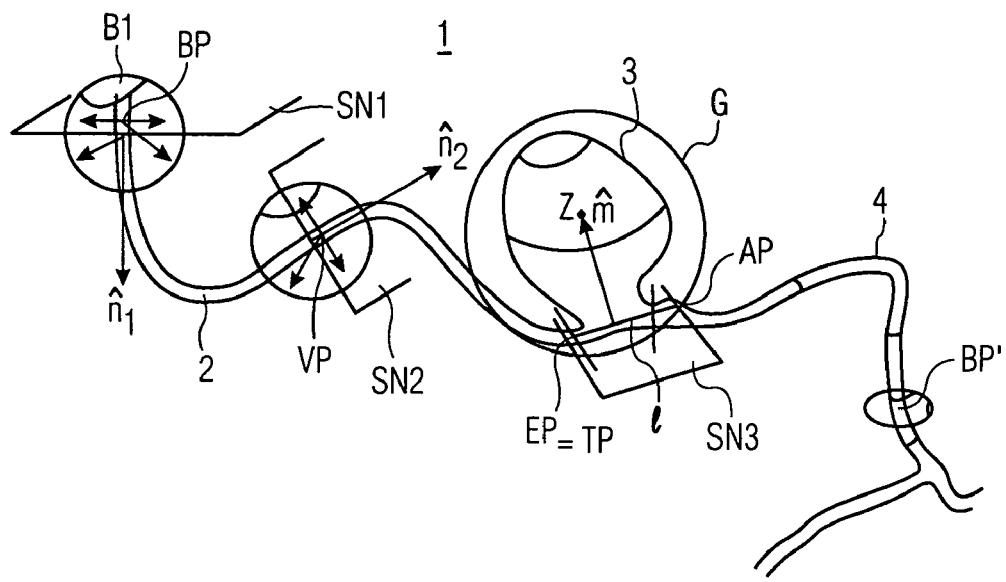

The invention relates to a method of analyzing an object data set on a multi-dimensional space.

Such an object data set represents one or more properties of the object to be examined. The object data set notably relates to the density distribution in the object to be examined; in that case the data values are the local density values of (a part of) the object to be examined. The data values may also relate, for example, to the distribution of the temperature or the magnetization in the object. The multi-dimensional space is usually the three-dimensional space. The data values then relate to a volume distribution of the relevant property, for example, the density distribution in a volume of the object to be examined. The multi-dimensional space may also be two-dimensional. In that case the data values relate to a distribution of the relevant property in a plane through the object, for example the density distribution in a cross-section through the object.

The object data set can be acquired in a variety of ways. The object data set notably relates to a patient to be examined. Such an object data set can be acquired by means of various techniques such as 3D X-ray rotational angiography, computed tomography, magnetic resonance imaging or magnetic resonance angiography.

The article "3D rotational angiography: Clinical value in endovascular treatment" in Medica Mundi 42 (1998) by J. Moret et al. concerns the determination of the section of a blood vessel.

According to the known method a more or less tubular structure relating to the blood vessel of the patient to be examined is identified from the object data set. Such an identification is performed on the basis of differences between data values relating to the blood vessel and to the surrounding tissue. Such differences are realized by introducing a suitable contrast agent into the vascular system of the patient to be examined during the acquisition of the object data set. According to the known method a cutting plane is visually taken in the object data set so as to extend more or less transversely of the tubular structure. Subsequently, the diameter of the relevant blood vessel is calculated from the cross-section of the tubular structure along the cutting plane.

It is a drawback of the known method that it is difficult to orient the cutting plane so as to extend accurately perpendicularly to the tubular structure. This inaccuracy introduces serious errors in the calculated diameter of the relevant blood vessel.

It is an object of the invention to provide a method wherein analysis of a tubular structure in the object data offers more accurate results than the known method. It is notably an object of the invention to provide a method whereby the diameter of such a tubular structure can be accurately determined.

This object is achieved according to the invention by means of a method of analyzing an object data set in which a tubular structure occurs, wherein
  said object data set assigns data values to positions in a multi-dimensional space, which data values relate to an object to be examined,
  a starting position is chosen in or near the tubular structure,
  gradients to the surface of the tubular structure are derived at the area of the starting position,
  a cutting plane is derived through the starting position so as to have a direction as parallel as possible to the gradients in positions to the surface of the tubular structure and in a vicinity of the starting position, and
  a cross-section of the tubular structure is derived along the cutting plane.

The object data set can be acquired, for example, by means of various techniques such as magnetic resonance angiography, computed tomography or 3D rotational X-ray angiography. Techniques of this kind produce an object data set with data values representing the structure of (a part of) the vascular system of the patient to be examined.

The tubular structure concerns a part of the object data set in which the data values deviate from the surroundings of the tubular structure. The deviating data values lie, for example, in a selected range of data values which are larger than a predetermined threshold or smaller than a predetermined ceiling value. The positions in the multi-dimensional space for which the data values have such a deviating value are situated in an elongate, more or less tubular region. This tubular region may be shaped as a vacated or a filled tube. The tubular structure can be indicated in the object data set by means of segmentation techniques, thus identifying the positions with the deviating data values.

The starting position indicates the position in which the cross-section of the tubular structure is desired. The starting position can be indicated, for example, by pointing it out in a rendition of the object data set on a display screen.

The gradients concern local differences between data values at the area of the surface. According to the invention the normal vector to the cutting plane is oriented exactly transversely of the gradients to the surface. The normal vector is oriented in such a manner that the normal vector is perpendicular to the gradients with a small tolerance only. The cutting plane can thus be oriented substantially parallel to the tubular structure. As a result, the diameter of the tubular structure can be accurately derived from the cross-section of the tubular structure. This diameter represents, for example, a useful technical result of the examination of the vascular system of the patient to be examined. It is notably possible to perform an accurate examination of stenoses or aneurysms.

These and other aspects of the invention will be described in detail hereinafter on the basis of the following embodiments which are defined in the dependent claims.

The normal vector to the cutting plane is oriented, for example, by minimizing the weighted sum of the squares of the scalar products of the normal vector and the gradients to the surface of the tubular structure in a (small) vicinity of the starting position while varying the normal vector to the cutting plane. The weights in the weighted sum can be used, for example to make the effect of gradients in positions nearer to the starting point on the normal vector to the cutting plane greater than the effect of gradients in positions situated somewhat further from the starting position.

Preferably, a local center of the tubular structure in the cutting plane is derived from positions in the cutting plane having data values in the selected range. This local center represents the center of the tubular structure in the cross-section along the cutting plane. For example, the local center is situated in a position which is situated at approximately the same distance from practically all positions in the cutting plane having data values in the selected range. It has been found that in many cases the vast majority of such positions having data values in the selected range and in the cutting plane represent locations at the edge of the tubular structure.

Preferably, positions in which the gradients have a magnitude greater than a minimum value are used to derive the local center. Positions at the edge of the tubular structure are thus accurately selected.

An even more accurate result for the local center is achieved iteratively by means of the method defined in claim 4. Preferably, a subdivision into four equally large sectors is used. Positions outside the relevant tubular structure are excluded by determining the minimum distance of positions having data values in the selected range in each sector. When different minimum distances from the current center position of the local center occur in different sectors, the current center position will not be situated exactly at the center of the tubular structure. A more accurate estimate of the center position is obtained by shifting the center position slightly in the direction of the sector in which the largest minimum distance occurs. Preferably, the center position is shifted over a distance corresponding to half the difference between the minimum distances in oppositely situated sectors.

According to the invention it is also possible to track the longitudinal axis of the tubular structure. To this end there is derived a subsequent position which is shifted in the direction of the normal to the cutting plane in the starting position. A next cutting plane through the subsequent position is then derived in conformity with claim 1. In the next cutting plane a local center of the cross-section through the tubular structure is determined again. Successive local centers are derived along the tubular structure by repetition. The magnitude of the shift along the tubular structure can be chosen by the user. The tracking of the tubular structure will be more exact as the shifts for deriving each time a next subsequent position are smaller. Preferably, a series of diameters is calculated for the series of cross-sections through the tubular structure thus obtained along respective cutting planes. This offers a thorough insight into the variation of the diameter of the tubular structure along the longitudinal axis of the structure. This result constitutes a useful aid for examining the extent of stenosis in the vascular system of the patient to be examined.

The invention is preferably used for tracking a tubular structure which includes a reservoir whereto inlet and outlet ducts are connected. The reservoir typically has a diameter which is significantly larger than that of the inlet and outlet ducts. Such a situation occurs, for example, in the case of an aneurysm. The actual aneurysm then corresponds to the reservoir whereas the inlet and outlet ducts correspond to the blood vessels feeding and draining the blood to and from the actual aneurysm. The method disclosed in claim 6 is preferably used in such a situation. According to the invention the inlet and outlet points can be determined by tracking the inlet and outlet ducts in conformity with claim 5. Preferably, such tracking of the inlet and outlet ducts is observed on a monitor by the user who can terminate the tracking operation as soon as the connections to the reservoir are reached. Subsequently, a central position is determined in the reservoir. For example, a part of the object data set which contains the reservoir and a small (relative to the reservoir) number of positions outside the reservoir is selected. It has been found that the center of gravity of the data values in the selected part of the object data set suitably corresponds to the center of the reservoir. The cutting plane through the inlet and outlet points and through the center of the reservoir separates the reservoir from the inlet and outlet ducts. The volume of the reservoir to the side of the cutting surface which faces the central position accurately represents the effective volume of the reservoir. When the reservoir with the inlet and outlet ducts represents an aneurysm and the connected blood vessels, the effective volume of the reservoir constitutes an accurate result concerning the size of the aneurysm; this is of importance for the further treatment of the aneurysm.

Preferably, the method is carried out by means of a suitably programmed workstation. For example, a computer program with instructions for carrying out the steps as defined in the claims 1 to 7 is loaded into such a workstation.

Claim 7 defines a further application of the invention for a tubular structure with a reservoir whereto inlet and outlet ducts are connected. The inlet and outlet points are determined again by tracking the inlet and outlet ducts in conformity with claim 5. According to this application of the invention a connection duct is interpolated between the inlet point and the outlet point and through the reservoir. Subsequently, the connection duct is isolated from the reservoir. It has been found that the remainder constitutes a good approximation of the effective reservoir which can be suitably used for determining the size of the aneurysm.

Figure 2:
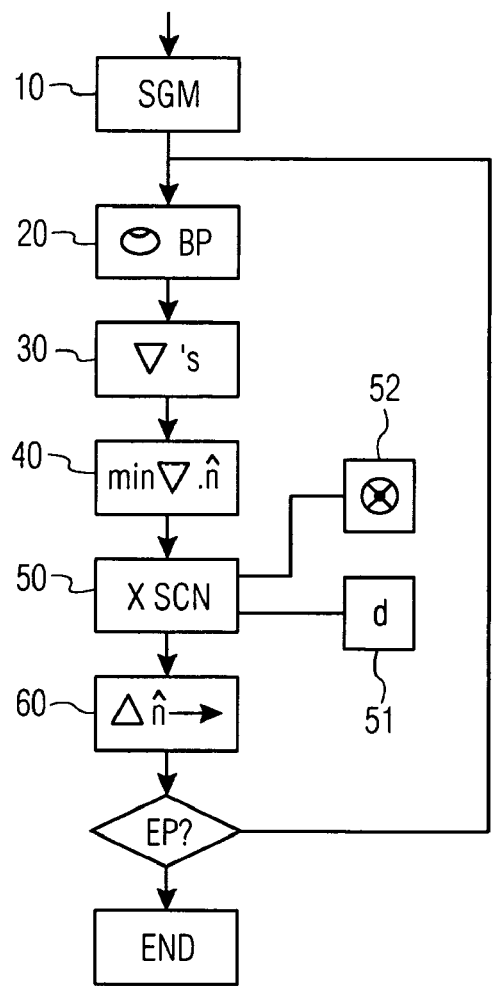

These and other aspects of the invention will be elucidated, by way of non-limitative example, with reference to the following embodiments and the accompanying drawing; therein:

FIG. 1 shows an example of an object data set with a tubular structure in which the application of the invention is indicated, and FIG. 2 shows an example of a flow chart of the method according to the invention.

FIG. 1 shows an example of an object data set containing a tubular structure in which the application of the invention is indicated. FIG. 2 shows an example of a flow chart of the method according to the invention. FIG. 1 notably shows the tubular structure, in this case a rendition of a part of the vascular system of the patient to be examined, which has already been segmented from the possibly larger object data set. This is represented by the step 10 in FIG. 2. The segmentation consists, for example, in that all data values are set to a fixed value in positions in which the original object data set contains data values outside the selected range. The vascular system includes an aneurysm 3 which acts as a reservoir, a blood vessel 2 which transports blood to the aneurysm 3 and a blood vessel 4 via which blood is discharged from the aneurysm 3. The blood vessels 2 and 4 thus act as an inlet duct and an outlet duct. The starting point (BP) is selected by the user, for example by pointing it out on the display screen of a workstation by means of a mouse and/or a keyboard and a cursor. Around the starting point (BP) there is taken a sphere (B1) as indicated in step 20. The gradients ($g_{1j}$) of the data values are calculated at points on the edge of the tubular structure in the sphere (B1); this is indicated in step 30. More explicitly the gradients are calculated as follows:

$$g_{1_j} = \begin{pmatrix} \frac{\partial D}{\partial x_j} \\ \frac{\partial D}{\partial y_j} \\ \frac{\partial D}{\partial z_j} \end{pmatrix},$$

where $(x_j, y_j, z_j)$ is the position at issue at the surface of the tubular structure and D indicates the data-values of the data-set which represent for example the pixel-values or the voxel-values of the object to be examined. Consequently, the vector $g_{1j}$ points transverse to the surface of the tubular structure. Subsequently, in step 40 the normal vector $\hat{n}_1$ is calculated by means of a minimization process, so that the sum $\Sigma_j w_j (\hat{n}_1 \cdot g_{1j})^2$ is minimum. The weight factors $w_j$ are to be adjusted by the user; preferably, the weight factors decrease as the distance between the position in which the gradient $g_{1j}$ is calculated and the starting point BP is larger. The cutting plane SN1 has a normal vector $\hat{n}_1$ and extends through the starting point BP. The cross-section through the tubular structure 1 along the cutting plane SN1 is taken in step 50. In step 51 the local diameter d of the tubular structure 1, i.e. of the blood vessel, is derived from this cross-section. Furthermore, in step 52 the local center position of the tubular structure is derived from the cross-section by executing the iterative procedure in conformity with claim 4.

In order to track the tubular structure as from the starting point BP, in step 60 the subsequent position VP is derived in the direction of the normal vector $\hat{n}_1$ which is locally oriented accurately along the axis of the blood vessel. The magnitude of the shift is adjusted by the user in dependence on the degree of meandering of the tubular structure. FIG. 1 shows a subsequent position VP which is reached after a large number of shifts along the axis of the blood vessel 2. When the subsequent position is not yet the end position (EP) desired by the user, the steps 20, 30, 40, 50, 51, 52 and 60 are repeated. Thus, the axis along the blood vessel and the diameter along the axis are thus determined.

For example, the end point EP is the inlet point TP from the blood vessel 2 to the aneurysm 3. The outlet point AP is reached by tracking the blood vessel from a different starting point BP' on the blood vessel 4 by means of the procedure shown in FIG. 2. For example, the user himself can terminate the tracking of the blood vessel when, on the basis of the anatomical insight of the user, the inlet point or outlet point has been reached. It is also possible to terminate the tracking of the blood vessel when the local diameter of the blood vessel suddenly increases strongly. A connecting line 1 is drawn through the inlet point and the outlet point (TP, AP). Furthermore, the central position Z of the aneurysm 3 is calculated as the center of gravity on the basis of the data values in the region G. The region G is, for example, a sphere around the aneurysm 3. It has been found that suitable results are achieved for the center position Z when it is ensured that the region G does not include too many points in the segmented data set which lie outside the aneurysm. The normal vector $\hat{m}$ is directed opposite to the perpendicular from Z to the connecting line 1. Subsequently, a cutting plane SN3 is determined through the connecting line and with the normal vector $\hat{m}$. It appears that this cutting plane SN3 accurately separates the inlet and outlet ducts, in this case being the blood vessels 2 and 4, from the aneurysm 3.

What is claimed is:

1. A computer-implemented method of analyzing an object data set in which a tubular structure occurs, wherein
    said object data set assigns data values to positions in a multi-dimensional space, which data values relate to an object to be examined,
    a starting position is chosen in or near the tubular structure,
    gradients to the surface of the tubular structure are derived at the area of the starting position,
    a cutting plane is derived through the starting position so as to have a direction as parallel as possible to the gradients in positions to the surface of the tubular structure and in a vicinity of the starting position, and
    a cross-section of the tubular structure is derived along the cutting plane.

2. A method as claimed in claim 1, wherein the direction of the cutting plane is derived by minimization of the sum of the squares of the scalar products of the normal vector to the cutting plane and the gradients.

3. A method as claimed in claim 1, wherein a local center of the tubular structure in the cutting plane is derived from positions in the cutting plane having data values within a predetermined range, such a range concerning notably data values higher than a threshold value or data values smaller than a ceiling value.

4. A method as claimed in claim 3, wherein the cutting plane is subdivided into a plurality of sectors and
    a center position of the local center of the cross-section of the tubular structure in the cutting plane is estimated,
    for the respective sectors a minimum distance is derived between positions having data values in the preselected range and a current estimated center position,
    a maximum of the minimum distances in the respective sectors is determined,
    a new estimate of the center position is derived, the new estimate of the center position being shifted, relative to the current estimate, in the cutting plane in the direction of the sector in which the maximum of the minimum distances is situated and over a distance which is dependent on the differences between positions in which the minimum distances occur in oppositely situated sectors,
    the steps b, c and d are repeated, if necessary, the new estimate of the center position being used each time as the current estimate.

5. A method as claimed in claim 3, wherein
    a subsequent position which has been shifted, relative to the starting position, in the direction of the normal to the cutting plane through the starting position is determined, and
    a subsequent cutting plane through the subsequent position is derived, the direction of said subsequent cutting plane being as parallel as possible to the gradients in said subsequent cutting plane and to the surface of the tubular structure.

6. A computer-implemented method of analyzing an object data set in which a tubular structure occurs, wherein
    said object data set adds data values to positions in a multi-dimensional space,
    an inlet duct, an outlet duct and a reservoir occur in the tubular structure, the inlet and outlet ducts being connected to the reservoir, and
    an inlet point is determined in the inlet duct at the area of connection of the inlet duct to the reservoir,
    an outlet point is determined in the outlet duct at the area of connection of the outlet duct to the reservoir,
    a central position of the reservoir is determined, and
    a cutting plane through the inlet and outlet points is derived, the normal to the cutting plane extending along the perpendicular from the central position to the line through the inlet and outlet points.

7. A computer-implemented method of analyzing an object data set in which a tubular structure occurs, wherein
    said object data set adds data values to positions in a multi-dimensional space,
    an inlet duct, an outlet duct and a reservoir occur in the tubular structure, the inlet and outlet ducts being connected to the reservoir, and
    an inlet point is determined in the inlet duct at the area of connection of the inlet duct to the reservoir, an outlet point is determined in the outlet duct at the area of connection of the outlet duct to the reservoir, a connecting duct is interpolated between the inlet and outlet points and through the reservoir, and a remainder is derived as the difference between the reservoir and the interpolated connecting duct.

8. A computer programme embodied on a tangible medium for analysing an object data set in which a tubular structure occurs, the object data set assigning data values to positions in a multi-dimensional space, which data values relate to an object to be examined, the computer programme comprising instructions for choosing starting position in or near the tubular structure deriving gradients to the surface of the tubular structure are derived at the area of the starting position deriving a cutting plane through the starting position so as to have a direction as parallel as possible to the gradients to the surface of the tubular structure in positions in the vicinity of the starting position and deriving a cross section of the tubular structure along the cutting plane.

\* \* \* \* \*